(12) United States Patent
Yang

(10) Patent No.: US 7,899,079 B2
(45) Date of Patent: Mar. 1, 2011

(54) SYSTEM FOR MANAGING RESERVED BITS IN A VARIABLE-LENGTH MESSAGE AND OPTIMIZING MESSAGE DECODING UTILIZING THE SAME

(75) Inventor: Yunsong Yang, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 620 days.

(21) Appl. No.: 11/780,203

(22) Filed: Jul. 19, 2007

(65) Prior Publication Data

US 2008/0049861 A1 Feb. 28, 2008

Related U.S. Application Data

(60) Provisional application No. 60/823,381, filed on Aug. 24, 2006.

(51) Int. Cl.
*H04J 3/16* (2006.01)
(52) U.S. Cl. ...................................... 370/470
(58) Field of Classification Search ......... 370/328–332, 370/338, 389, 392, 465, 470–476
See application file for complete search history.

(56) References Cited

U.S. PATENT DOCUMENTS

| 5,201,056 | A  | * | 4/1993 | Daniel et al. | .................. 712/41 |
| 7,016,366 | B2 | * | 3/2006 | Kawarai et al. | ............. 370/413 |
| 2005/0135354 | A1 | * | 6/2005 | Yoakum et al. | ............. 370/389 |

OTHER PUBLICATIONS

Viterbi, A.J., "Error Bounds for Convolutional Codes and an Asymptotically Optimum Decoding Algorithm," IEEE Transactions on Information Theory, vol. 13, Issue 2, Apr. 1967, pp. 260-269.
Huawei, "SSCH Padding Bit Position," 3rd Generation Partnership Project 2, Aug. 25, 2006, pp. 1-9.

\* cited by examiner

*Primary Examiner*—Derrick W Ferris
*Assistant Examiner*—Mohammad Anwar
(74) *Attorney, Agent, or Firm*—Slater & Matsil, L.L.P.

(57) ABSTRACT

A system of structures and operations is provided for managing reserved bits in a variable-length message, and for optimizing decoding performance of such a message using such reserved bits.

18 Claims, 4 Drawing Sheets

SYSTEM FOR MANAGING RESERVED BITS IN A VARIABLE-LENGTH MESSAGE AND OPTIMIZING MESSAGE DECODING UTILIZING THE SAME

PRIORITY CLAIM

This application claims the priority benefit of U.S. Provisional Application No. 60/823,381, filed Aug. 24, 2006.

TECHNICAL FIELD OF THE INVENTION

The present invention relates generally to a wireless communications system and, more particularly, to a system for managing reserved bits in a variable-length message and optimizing decoding of such message utilizing such reserved bits in a wireless communications system.

BACKGROUND OF THE INVENTION

To better support voice and packet data services in a wireless communications system, a traffic channel, by which a plurality of mobile stations communicates with a base station, is shared among the plurality of mobile stations. Transmission on the traffic channel is scheduled by the base station, based on channel condition information sent by the mobile stations on a reverse link. The sharing of the channel may be achieved using FDMA, TDMA, CDMA, or OFDMA techniques.

A Forward link Shared Signaling Channel (F-SSCH) carries a number of signaling messages that allocate or de-allocate different resources for a traffic channel, to or from a given mobile station. A collection of forward link signaling messages, developing in conjunction with the evolution of cdma2000 air interface standards, is illustrated in Table 1. Columns in Table 1 indicate different fields in a message, while rows correspond to different signaling messages. Every cell in Table 1 indicates multiplicity of a given field. A 3-bit Message (Mssg.) Type field allows a mobile station to identify the type of message, and therefore properly interpret subsequent fields. The set of information bits of every valid message is extended by a 16-bit cyclic redundancy check (CRC) to enable reliable detection.

The first type of message carries an Access Grant message, and is used to acknowledge an access attempt by a mobile station, to assign a new MACID, and to supply a 6-bit timing adjustment for the mobile station—so that it may align its reverse link transmission with reverse link timing of a base station.

The remaining messages are forward link and reverse link assignment messages, and all have a "sticky", or persistent, bit that indicates whether an assignment is only for one packet, or lasts until explicitly de-assigned or lost due to packet failure. All of these assignment messages are also scrambled with the MACID of the target mobile station.

A forward link assignment message (FLAM) signals a forward link resource assignment to an active mobile station with resources assigned indicated by Channel Index (ChanID), and spectral efficiency indicated by Packet Format (PF). Whenever set, the Supplemental (Suppl.) assignment flag indicates an incremental assignment if the ChanID is not part of the existing assignment, or indicates a decremental assignment otherwise. A new assignment replaces an existing one if the Supplemental assignment flag is not set. The reverse link assignment message (RLAM) signals reverse link resource assignments, in a fashion identical to the FLAM.

A multi-codeword (MCW) FLAM is a forward link assignment message that may be used for mobile stations in the Multiple Input Multiple Output (MIMO) multi-codeword mode. Unlike the other assignment messages, this message indicates four packet formats corresponding to (at most) four MIMO layers (code words). This assignment message is split into two parts, namely MCW FLAM1 and MCW FLAM2, as shown in Table 1.

In the event when the number of layers in use is less than four, remaining PF fields are set to zero. A single-codeword (SCW) FLAM for MIMO operation is similar to the FLAB, except that it also indicates rank of the MIMO transmission. In addition, the Message Types of "110" and "111" are not used and are reserved.

Many, if not most, messages in Table 1 span between 31 and 34 bits, including 16-bit CRC. Based on this, all messages can be padded to a target or maximum number of bits (e.g., 34) with a relatively low efficiency loss. For example, the Access Grant message illustrated in Table 1 has a total length of 34 bits, including 16-bit CRC; and therefore no padding bit is needed for this Access Grant message. The FLAM message illustrated in Table 1 has a total length of 32 bits, including 16-bit CRC; and therefore requires two padding bits. Having a unified size for all signaling messages is convenient when all messages are encoded and modulated separately, since it removes overhead associated with indicating message sizes.

Conventional padding schemes add some type of Reserved Bits field—which typically consists of all "0" bits—at the end of a variable-length message body; in order to make total length of the message fixed. Prior Art FIG. 1 illustrates a conventional structure of message FLAM 100, corresponding to the example of Table 1.

Referring to FIG. 1, message FLAM 100 consists of a 3-bit Message (or Block) Type 110, a 1-bit Sticky 120 flag, a 6-bit Channel ID (ChanID) 130, a 4-bit Packet Format (PF) 140, a 1-bit Extended Transmission (Ext. Trans.) 150, and a 1-bit Supplement 160 flag. A 2-bit Reserved (Rsvd) Bits 170 is

TABLE 1

| Field<br># bits | Mssg.<br>type<br>3 | MACID<br>9 | Sticky<br>1 | ChanID<br>6 | PF<br>4 | Ext.<br>TX<br>1 | Timing<br>6 | Suppl.<br>1 | Rank<br>2 |
|---|---|---|---|---|---|---|---|---|---|
| Access Grant | 000 | 1 | 0 | 0 | 0 | 0 | 1 | 0 | 0 |
| FLAM | 001 | 0 | 1 | 1 | 1 | 1 | 0 | 1 | 0 |
| RLAM | 010 | 0 | 1 | 1 | 1 | 1 | 0 | 1 | 0 |
| MCW FLAM1 | 011 | 0 | 1 | 1 | 1 | 1 | 0 | 1 | 0 |
| MCW FLAM2 | 100 | 0 | 0 | 0 | 3 | 0 | 0 | 0 | 0 |
| SCW FLAM | 101 | 0 | 1 | 1 | 1 | 1 | 0 | 1 | 1 | padded at the end of the message body. In addition, a 16-bit CRC is added after the reserved bits to make total length of the message 34 bits. Reserved Bits 170 are set to "00". As a result, "00", "10", and "11" are not used on Reserved Bits 170, and may be reserved for future usage.

Unfortunately, however, this method causes un-used and reserved message numbering space to be fragmented. For example, the message numbering space that can be represented with "001xxxxxxxxxxx00" is used for FLAM, where "x" can be "0" or "1". The message numbering spaces that can be represented with "001xxxxxxxxxxx01" and "001xxxxxxxxxxx1x" are reserved, where "x" can be "0" or "1"—but these spaces are fragmented. Thus it may be inefficient or inconvenient to add new signaling messages on the F-SSCH in the future, using such fragmented reserved numbering space.

SUMMARY OF THE INVENTION

The present invention provides a system, comprising various methods and constructs, for managing reserved bits in a variable-length message. The present invention maintains unused message numbering space contiguously; providing for new message developments or additions in the future. The present invention further manages reserved bits, and information pertaining thereto, in a manner that optimizes decoding of a message.

More specifically, embodiments of the present invention add reserved bits in a variable-length message in a manner that keeps unused message numbering space contiguous. Such embodiments send a Message Type field at the beginning of a message. The Message Type determines interpretation of the remaining bits in the message. The number of reserved bits needed is determined, based on the Message Type and total target message length. A Reserved Bits field is placed immediately after the Message Type, if the number of reserved bits needed is not zero. At least one more field is sent in the message.

Other embodiments of the present invention provide a communication system that comprises a base station (BS), a mobile station (MS), and a variable-length message that may contain reserved bits. The BS transmits the message on a Forward link shared signaling channel. The MS receives a Message Type field in the message; and determines the number of reserved bits based on the Message Type received. The rest of the message is received by the MS if the number of reserved bits is zero. If the number of reserved bits is not zero, a determination is made by the MS as to whether the received reserved bits are all "0". The rest of the message is discarded by the MS if the received reserved bits are not all "0". The rest of the message is received by the MS if the received reserved bits are all "0".

Still other embodiments of the present invention provide a communication system that comprises a base station (BS), a first mobile station (MS), a second MS, and a variable-length message that may contain reserved bits. The BS transmits the message on a Forward link shared signaling channel. The first MS, which only complies with the initial standard protocol, receives the Message Type field in the message; and determines the number of reserved bits based on the Message Type received. The rest of the message is received by the first MS if the number of reserved bits is zero. If the number of reserved bits is not zero, a determination is made by the first MS as to whether the received reserved bits are all "0". The rest of the message is discarded by the first MS if the received reserved bits are not all "0". The rest of the message is received by the first MS if the received reserved bits are all "0". The second MS, which is introduced to the system at a later time when the standard protocol is enhanced with new type(s) of message transmitted on the Forward link shared control channel, receives the extended Message Type field, which consists of the original Message Type field and at least one bit from the original reserved bits, in the message. Then the second MS interprets the rest of the message based on the extended Message Type.

Certain embodiments of the present invention optimize decoding performance of a message that contains reserved bits, by utilizing information pertaining to the reserved bits. These embodiments form a first group of paths from a set of survival paths related to a previous received bit. A second group of paths are identified from the first group of paths. Each has a root from input Message Type bits that are followed by the reserved bits field in the message; and each is generated from an invalid input bit. A third group of paths is formed by removing the second group of paths from the first group of paths. The survival paths among the third group of paths are selected using a maximal-likelihood decoding algorithm; and this process is repeated until decoding of the message is complete.

The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

In accordance with the present invention, Table 2 (shown below) illustrates an embodiment of the present invention for adding Reserved Bits in a variable-length message body, in order to keep the total message length fixed. As shown in Table 2, the existence of the Reserved Bits field in the message depends on Message Type and total message length. If the total length of the rest of the message including the Message Type field and the CRC bits is less than the fixed maximal message length, a Reserved Bits field is placed immediately after the Message Type field and before at least one more field. Otherwise, a Reserved Bits field is omitted.

If a Reserved Bits field is included, the number of reserved bits equals the fixed maximal length of all messages less the total length of the rest of the message, including the Message Type field and the CRC bits, and each bit in the Reserved Bits field is set to "0". The present invention comprehends alternative embodiments, however, for determining the number of Reserved Bits or their set value, depending upon a number of variables (e.g., network type, message protocols, transmission limitations, etc.).

then interpret the remainder of the message based on the value of the length-extended Message Type field.

Figure 3:
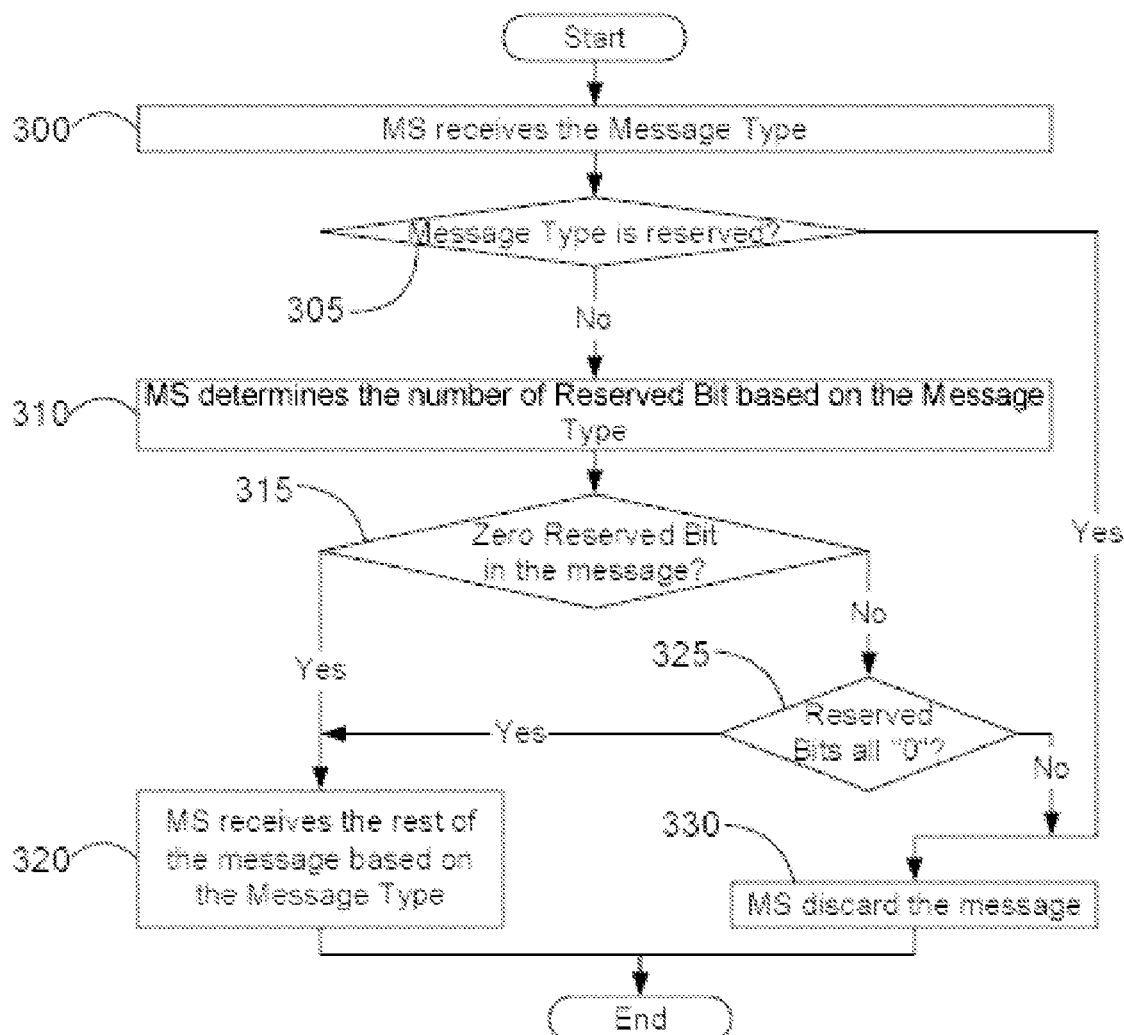
FIG. 3 depicts an illustrative example of a procedure for existing mobile stations to process a variable-length message that may contain reserved bits, providing for new message developments or additions in the future, according to certain aspects of the present invention.

In accordance with other aspects of the present invention, FIG. 3 depicts an illustrative process by which existing mobile stations, which complies with the earlier standard protocol, may process a variable-length message that may contain reserved bits, after CRC checks. Referring to FIG. 3, a mobile station first receives a Message Type field in step 300. In step 305, the mobile station determines if the Message Type is a valid message type or a reserved message type according to the earlier standards and specifications that the mobile station complies with. If it is an invalid or reserved message type, the mobile station discards the message in step 330.

If the message type is a valid message type according to the earlier standards and specifications that the mobile station complies with, the mobile station determines the number of reserved bits in step 310, based on the Message Type received in step 300. In step 315, the mobile station determines if the number of reserved bits is zero or not. If the number of

TABLE 2

| Field<br># bits | Mssg.<br>type<br>3 | Reserved<br>Bits<br>Variable | MACID<br>9 | Sticky<br>1 | ChanID<br>6 | PF<br>4 | Ext.<br>TX<br>1 | Timing<br>6 | Suppl.<br>1 | Rank<br>2 |
|---|---|---|---|---|---|---|---|---|---|---|
| Access Grant | 000 | 0 | 1 | 0 | 0 | 0 | 0 | 1 | 0 | 0 |
| FLAB | 001 | 1 | 0 | 1 | 1 | 1 | 1 | 0 | 1 | 0 |
| RLAB | 010 | 1 | 0 | 1 | 1 | 1 | 1 | 0 | 1 | 0 |
| MCW FLAB1 | 011 | 1 | 0 | 1 | 1 | 1 | 1 | 0 | 1 | 0 |
| MCW FLAB2 | 100 | 1 | 0 | 0 | 0 | 3 | 0 | 0 | 0 | 0 |
| SCW FLAB | 101 | 1 | 0 | 1 | 1 | 1 | 1 | 0 | 1 | 1 |
| (reserved) | 110 | 1 | 0 | 0 | 0 | 0 | 0 | 0 | 0 | 0 |
| (reserved) | 111 | 1 | 0 | 0 | 0 | 0 | 0 | 0 | 0 | 0 |

Figure 2:
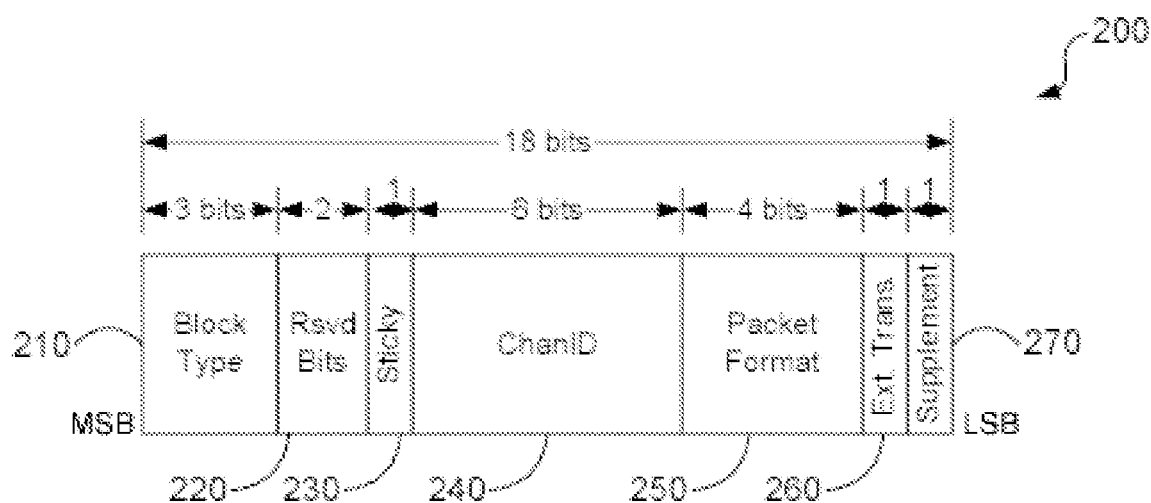
FIG. 2 depicts an illustrative example of adding reserved bits in a variable length message according to certain aspects of the present invention.

Referring now to FIG. 2, an example of structure for message FLAM 200 is depicted, in relation to the embodiment illustrated in Table 2. Message FLAM 200 consists of a 3-bit Message (or Block) Type 210, a 2-bit Reserved Bits 220 field, a 1-bit Sticky 230 flag, a 6-bit Channel ID (ChanID) 240, a 4-bit Packet Format (PF) 250, a 1-bit Extended Transmission (Ext. Trans.) 260, and a 1-bit Supplement 270 flag. In addition, a 16-bit CRC is added after the 1-bit Supplement 270 flag to make the total length of message 200 equal to 34 bits. Reserved Bits 220 are set to "00". As a result, "01", "10", and "11" are not used on Reserved Bits 220, and may be reserved for the future usage. Therefore, the message numbering space that can be represented with "00100xxxxxxxxxxx" is used for FLAM, where "x" can be "0" or "1". The message numbering spaces that can be represented with "00101xxxxxxxxxxx" and "00011xxxxxxxxxxx" are reserved, where "x" can be "0" or "1".

This provides a convenient and efficient expansion or revision capability. These numbering spaces accommodate message additions or supplements in the future. For example, a new Message Type may be added to existing standards and specifications in a future enhanced revision—by using a length-extended Message Type of "0011" in the four most significant bits (MSB) of a message, for example, while using a remaining twelve bits to transmit the rest of the message body. Such an approach would further provide backwards compatibility with existing messages, since the numbering ranges are not overlapping each other. A new mobile station that complies with future enhanced standards and specifications will read a length-extended Message Type field, and reserved bits is zero, the mobile station receives the rest of the message in step 320, based on the Message Type received in step 300. If the number of reserved bits is not zero, the mobile station determines if the received reserved bits are all "0" in step 325. If the received reserved bits are all "0", the mobile station receives the rest of the message in step 320, based on the Message Type received in step 300. Otherwise, the mobile station discards the message in step 330. Since the existing mobile station discards a message when—according to the Message Type field in that message—the expected Reserved Bits are not all "0", the existing mobile station will discard and therefore not falsely execute any new message that may be added at a later time and uses a previously reserved Message Type, or uses an extended length of Message Type field, as described above.

In addition to CRC bits for error detection, signaling messages are usually encoded for error protection. A rule of thumb is that: for a small message size (e.g., less than 10 bits), block code is preferred; for a medium message size (e.g., less than 100 bits), convolution code is preferred; and for a large message size (e.g., larger than 100 bits), turbo code and/or LDPC code are preferred.

When there are some message numbering spaces that are reserved due to the variable length of the message body and a receiver knows those reserved message numbering spaces then, according to other aspects of the present invention, decoding performance of such a message may be optimized by eliminating those combinations of message bits that are not possible transmissions from a transmitter. For example, in one embodiment, if a message is encoded with block code, and a maximum likelihood decoding algorithm is used to decode the message, decoding performance may be improved simply by eliminating hypothesis tests with those waveforms that correspond to encoded output sequence of those input message bits that are not possible transmissions from a transmitter.

Figure 1:
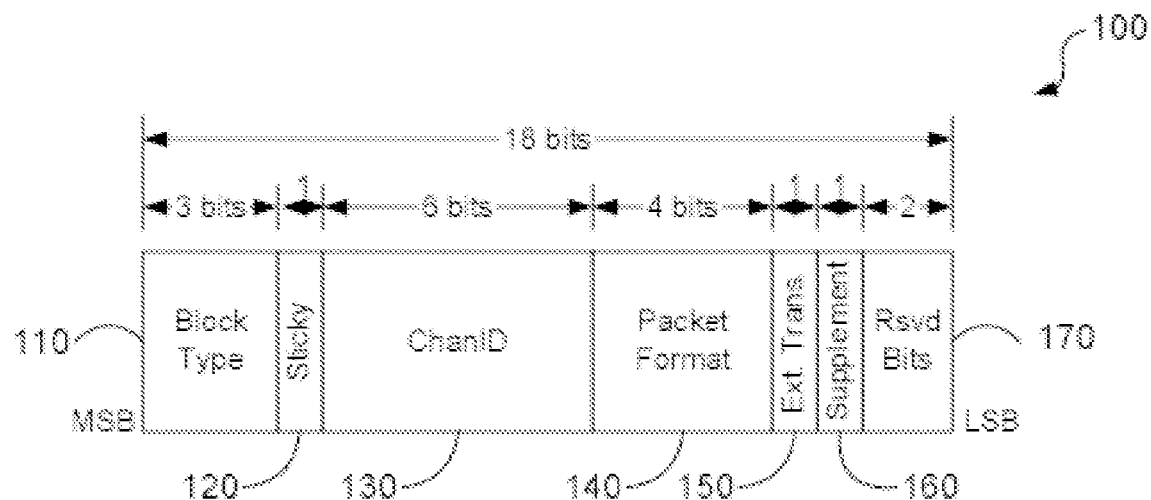
FIG. 1 is a diagram depicting a PRIOR ART method for adding padding bits in a variable length message.

This is illustrated in greater detail with reference to FIGS. 4 and 5, which depict trellis diagrams illustrating this optimization of decoding performance of a message—in an instance where the message is encoded using a convolution code and is decoded using a Viterbi algorithm. This aspect of the present invention may be used in conjunction with the message structure of the present invention, as illustrated and described above, and may also be used in conjunction with conventional message structures. As such, for purposes of illustration and explanation only, the message FLAM of Table 1 and the conventional padding method illustrated in FIG. 1 are first used to develop the illustration of FIG. 4; while the message FLAM and padding technique of the present invention are used to develop the illustration of FIG. 5.

Figure 4:
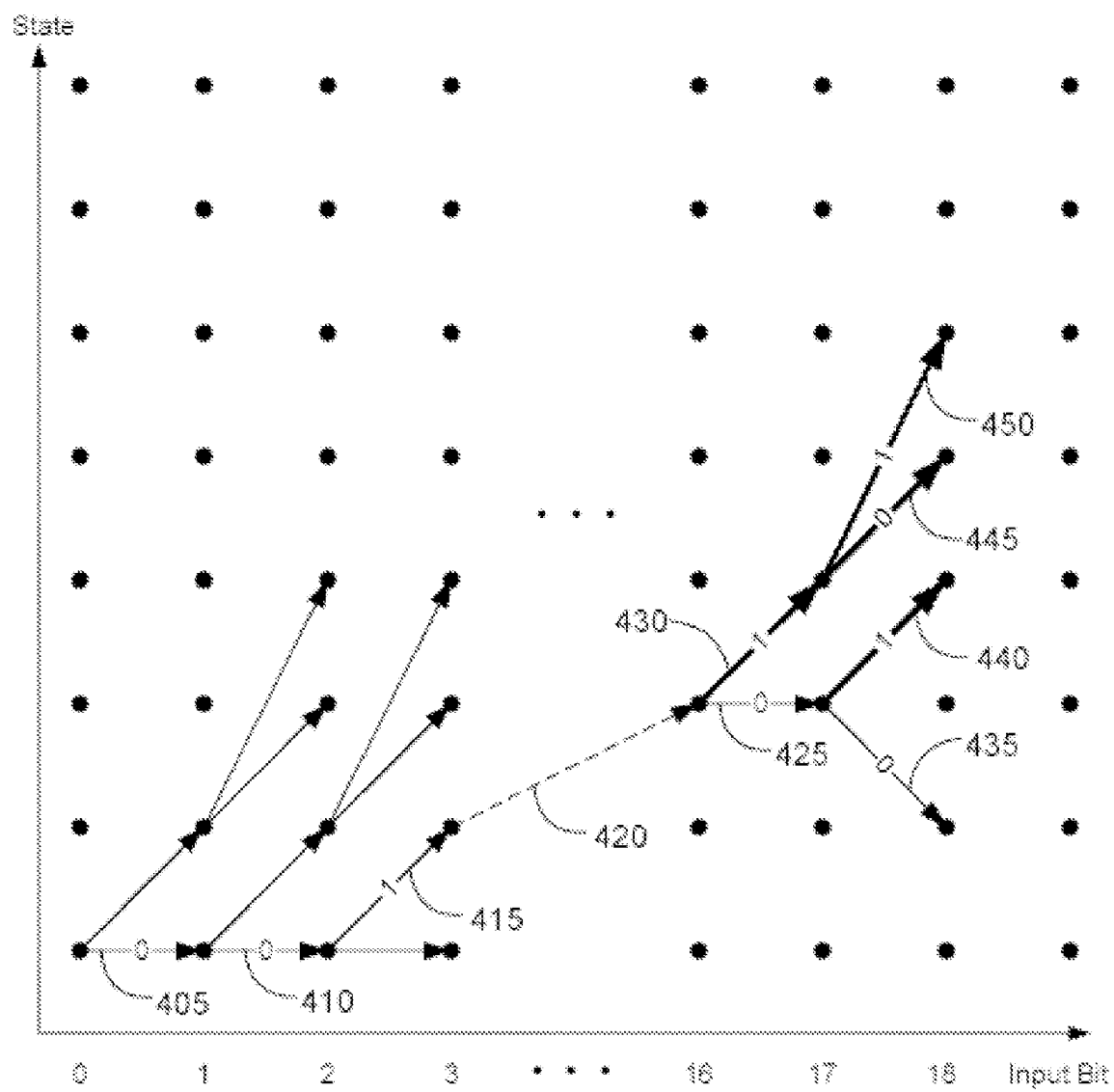
FIG. 4 depicts an illustrative example of a method for optimizing decoding performance of a message that contains reserved bits, according to another aspect of the present invention.
Figure 5:
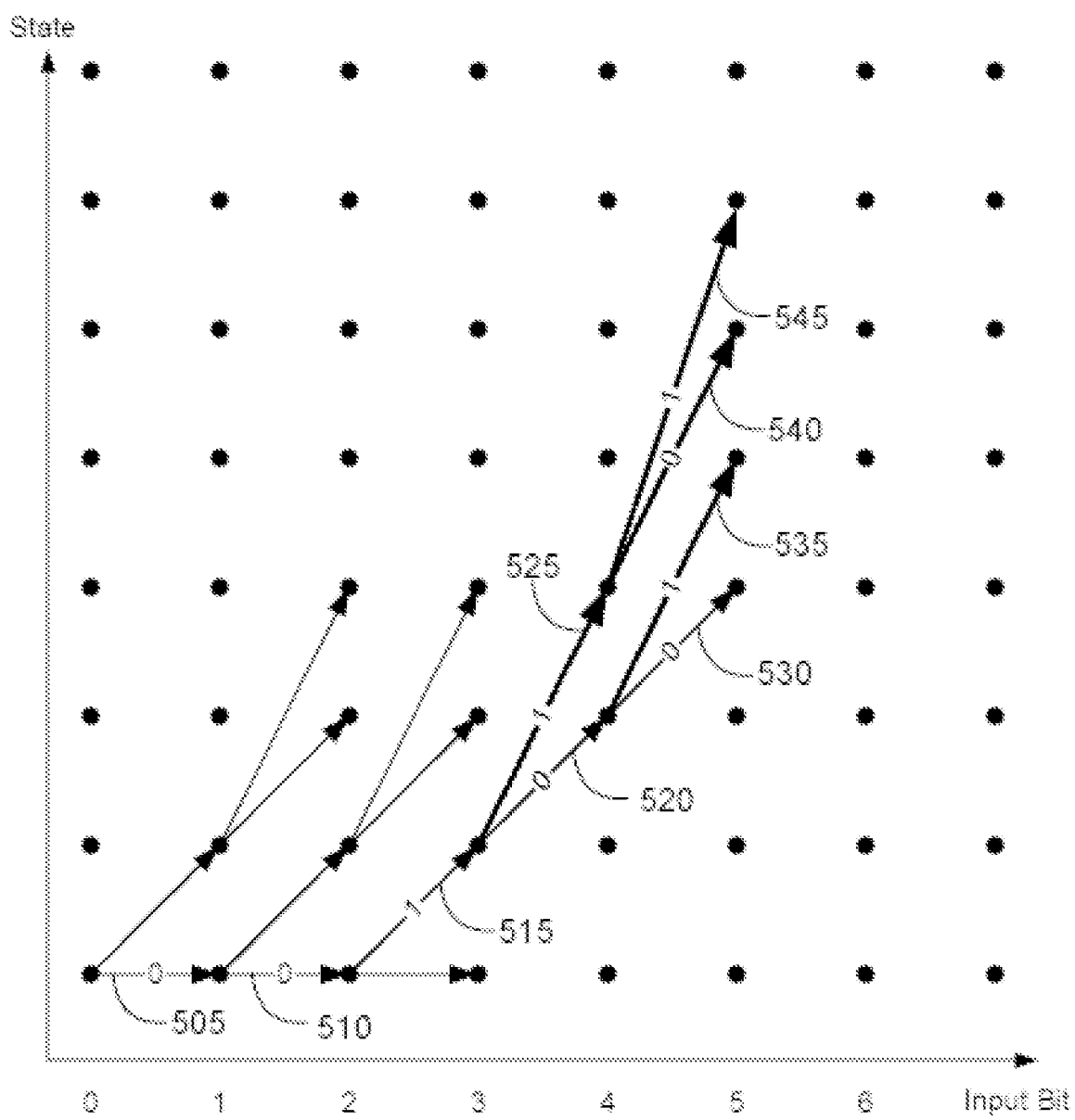
FIG. 5 depicts an illustrative example of a simplified method for optimizing decoding performance of a message that contains reserved bits, wherein the reserved bits are inserted between a Message Type field and a remainder of a message body, according to another aspect of the present invention.

Referring to FIG. 4, a first three bits being sent are "001" according to FLAM in Table 1. The correct path through the trellis that corresponds to these three input bits is path 405, 410, 415. Since there are other fields, with a total of 13 bits between the Message Type field and Reserved Bits (according to FIG. 1), then after the first 16 input bits, there will be 256 survival paths and 256 states using a Viterbi algorithm—if the constraint length of the convolution code is 9. However, only path 405, 410, 415, 420 is the correct path that corresponds to the first 16 input bits. Each of the 256 states will transit to two other states based on whether "0" or "1" is received on the seventeenth input bit, resulting in 512 possible paths. The Viterbi algorithm will choose 256 survival paths out of these 512 paths—each path corresponding to each state—based upon maximal likelihood criteria.

According to the present invention, a receiver may first eliminate any path between bit 16 and bit 17 that has a root of path 405, 410, 415, and corresponds to an input bit of "1" for the seventeenth input bit, before applying the Viterbi algorithm—since the receiver may determine that if the first three bits are "001", the seventeenth bit can not be "1". For example, the probability that path 405, 410, 415, 420, 430 is transmitted in the example in FIG. 4 is zero—no matter what log-likelihood-ratio (LLR) is computed, based on the received signal. Therefore, path 405, 410, 415, 420, 430 can be eliminated before applying a Viterbi algorithm. For similar reasons, path 405, 410, 415, 420, 425, 440; path 405, 410, 415, 420, 430, 445; and path 405, 410, 415, 420, 430, 450 may be eliminated before applying a Viterbi algorithm when the eighteenth bit is received. By eliminating those impossible paths, the receiver has a better chance to find a correct path among survival paths—thereby optimizing its decoding performance.

When Reserved Bits are padded at the end of a message body, according to conventional methods, there may be many survival paths that are rooted from input bits that correspond to a Message Type that has the Reserved Bits field. Therefore, a receiver has to conduct the process of elimination on all possible survival paths, requiring more processing power and memory. In addition, the number of Reserved Bits may be different for different Message Types. For example, the message FLAM in Table 1 needs a 2-bit Reserved Bits field, but the message MCW FLAM2 needs a 3-bit Reserved Bits field. As such, a receiver has to be configured with different elimination patterns for different Message Types, increasing its complexity for implementation.

The simplification method described above may be even further optimized in conjunction with message embodiments where reserved bits are inserted between a Message Type field and a remainder of the message body. The message FLAM as illustrated in relation to Table 2 and FIG. 2 is used to develop an example in FIG. 5 illustrating this embodiment. Referring to FIG. 5, a first three bits being sent are "001", according to Table 2. The correct path through the trellis that corresponds to these three input bits is path 505, 510, 515. The next two input bits being sent are "00". Therefore, the correct path is path 505, 510, 515, 520, 530.

Since a receiver knows that path 505, 510, 515, 520, 535, path 505, 510, 515, 525, 540, and path 505, 510, 515, 525, 545 are impossible, it can eliminate these paths before applying a Viterbi algorithm. Since the Reserved Bits are disposed between the Message Type field and the remainder of the message body, if the Reserved Bits field is included, then after the first three bits that correspond to the Message Type field are mapped to the trellis, only eight states are possible—not 256 states, as in the embodiment illustrated in FIG. 4. Therefore, when a fourth bit is received, the receiver only needs to eliminate invalid paths for a limited number of states, based upon the previously received bits and the possible survival paths stemming therefrom. Processing power and memory required for this operation is reduced. In fact, a mask may be implemented in hardware or software to mask out the invalid paths. Other embodiments of elimination are also comprehended by the present invention.

Although messages are sent by a base station and received by a mobile station in various examples illustrated above, the present invention comprehends utilization on messages sent between any communications stations. The various illustrative logical blocks, modules, and circuits described in connection with the embodiment disclosed herein may be implemented or performed with, but not limited to, a general purpose processor, a digital signal processor (DSP), an application specific integrated circuit (ASIC), a memory device such as RAM, ROM, EPROM, or EEPROM, a field programmable gate array (FPGA) or other programmable logic device, discrete gate or transistor logic, discrete hardware components, and any combination thereof designed to perform the functions described herein.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for a mobile station in a wireless communications system to process a variable length message, comprising the steps of:

determining if cyclic redundancy check for the variable length message is successful;

at the mobile station, receiving a Message Type field at the beginning of the variable length message;

at the mobile station, determining a number of reserved bits based upon the Message Type field received;

at the mobile station, receiving the remainder of the variable length message if the number of reserved bits is zero, otherwise, determining if received reserved bits are known bits;

at the mobile station, discarding the message if the received reserved bits are not known bits; and at the mobile station, receiving the remainder of the variable length message if the received reserved bits are known bits, wherein the received reserved bits are located immediately adjacent to the received Message Type field.

2. The method of claim 1, wherein the known bits are all "0" bits.

3. The method of claim 1, further comprising the step of discarding the variable length message if the Message Type field received indicates a reserved message type.

4. The method of claim 1, wherein the variable length message is a forward link assignment message.

5. The method of claim 1, wherein the variable length message is transmitted on a forward link shared signaling channel.

6. A method for a mobile station in a communications system to process a variable length message, comprising:
- at the mobile station, receiving at least a portion of a variable length message, the received portion having a Message Type field at a beginning of the received portion of the variable length message;
- at the mobile station, determining a number of reserved bits in the variable length message based upon the Message Type field;
- at the mobile station, if the number of reserved bits is not zero, determining if received reserved bits in the variable length message are known bits, wherein the received reserved bits are located immediately adjacent to the Message Type field in the variable length message;
- at the mobile station, discarding the message if the received reserved bits are not known bits; and
- at the mobile station, receiving the remaining portion of the variable length message if the number of reserved bits is zero or if the received reserved bits are known bits.

7. The method of claim 6, wherein the known bits are all "0" bits.

8. The method of claim 6, further comprising discarding the variable length message if the Message Type field received indicates a reserved message type.

9. The method of claim 6, wherein the variable length message is a forward link assignment message.

10. The method of claim 6, wherein the variable length message is transmitted on a forward link shared signaling channel.

11. The method of claim 6, further comprising determining if cyclic redundancy check for the variable length message is successful.

12. A mobile station comprising:
- a processor configured to implement a method, the method comprising:
  - receiving at least a portion of a variable length message, the received portion having a Message Type field at a beginning of the received portion of the variable length message;
  - determining a number of reserved bits in the variable length message based upon the Message Type field;
  - if the number of reserved bits is not zero, determining if received reserved bits in the variable length message are known bits, wherein the received reserved bits are located immediately adjacent to the Message Type field in the variable length message;
  - discarding the message if the received reserved bits are not known bits; and
  - receiving the remaining portion of the variable length message if the number of reserved bits is zero or if the received reserved bits are known bits.

13. The mobile station of claim 12, wherein the known bits are all "0" bits.

14. The mobile station of claim 12, further comprising discarding the variable length message if the Message Type field received indicates a reserved message type.

15. The mobile station of claim 12, wherein the variable length message is a forward link assignment message.

16. The mobile station of claim 12, wherein the variable length message is transmitted on a forward link shared signaling channel.

17. The mobile station of claim 12, further comprising determining if cyclic redundancy check for the variable length message is successful.

18. The mobile station of claim 12, wherein the received reserved bits are located immediately adjacent to the received Message Type field.

* * * * *